June 21, 1932.    L. ROSENFELD    1,863,805
ANTISPLASH DEVICE FOR LIQUID STRAINERS
Filed June 9, 1931
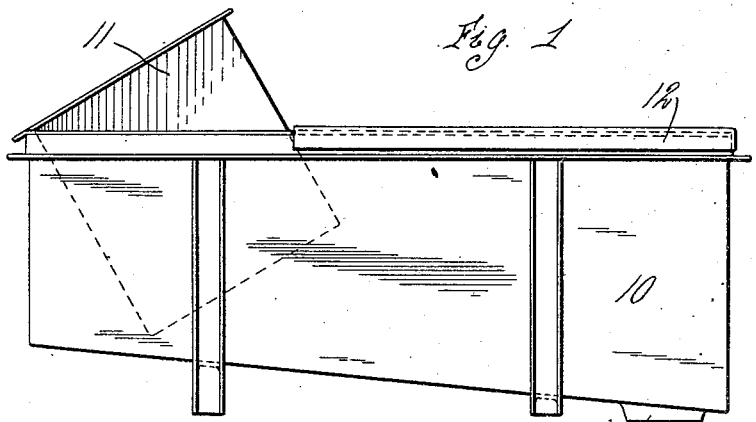
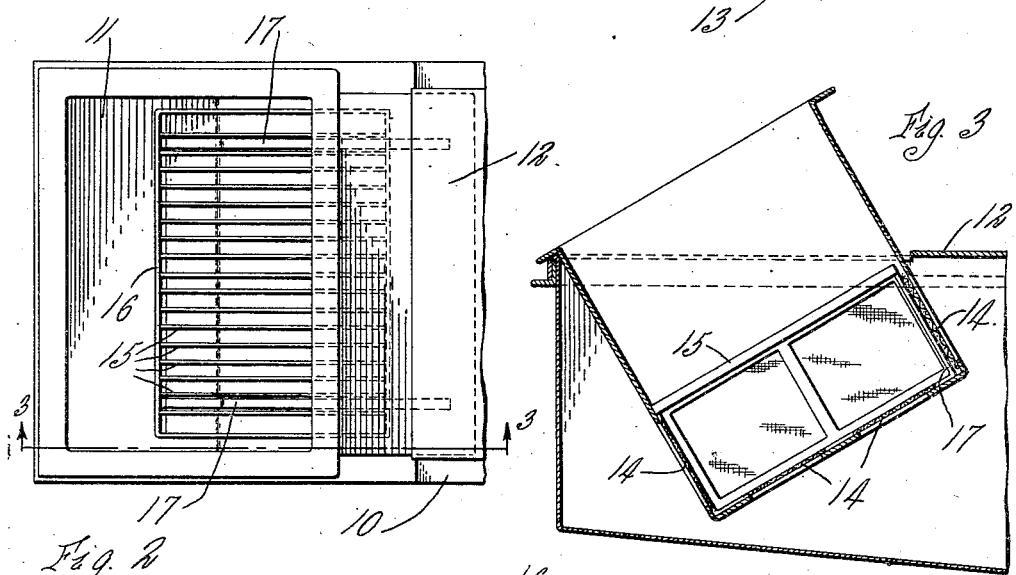
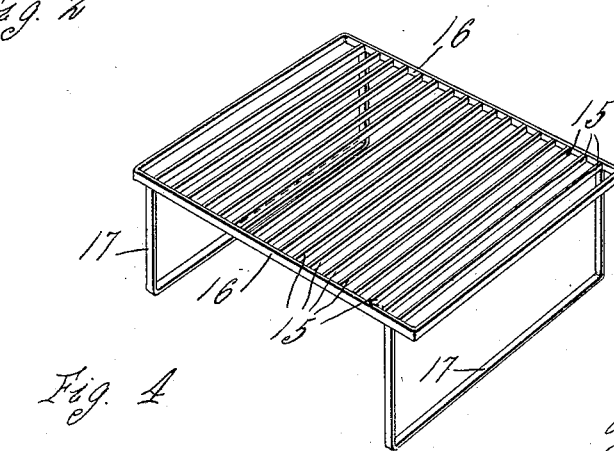
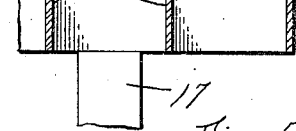
INVENTOR
Louis Rosenfeld
by Parker & Prochnow
ATTORNEYS Patented June 21, 1932

1,863,805

UNITED STATES PATENT OFFICE

LOUIS ROSENFELD, OF BALTIMORE, MARYLAND, ASSIGNOR TO CHERRY-BURRELL CORPORATION, OF WILMINGTON, DELAWARE, A CORPORATION OF DELAWARE

ANTISPLASH DEVICE FOR LIQUID STRAINERS

Application filed June 9, 1931. Serial No. 543,067.

This invention relates to antisplash grids or devices for use in liquid strainers such as the strainers of milk weighing cans, for the purpose of preventing the splashing and waste of the milk when it is being poured or dumped from milk cans into the strainers.

In dairies or establishments where milk is treated or handled for bottling or other purposes, it is customary to dump or pour the milk from the cans in which it is received from the producers into a weighing vat or receptacle in which the milk is weighed and from which it passes to treating or handling apparatus. The weighing vat is ordinarily equipped with a strainer through which the milk is poured for removing dirt or solid particles from the milk.

The antisplash grid or device forming the subject matter of my invention is placed in the milk strainer over or above the screened outlet thereof so that the milk in being dumped into the strainer, passes through the antisplash device.

An object of my invention is to provide a practical device which will efficiently prevent the liquid from splashing out of the strainer.

Other objects of the invention are to provide an improved antisplash device which will offer the minimum obstruction and resistance to the flow of the milk through the strainer but which will effectually prevent the splashing of the milk out of the strainer or on to the upper portions thereof; and also to improve devices for the purpose mentioned in the respects hereinafter described and set forth in the claims.

In the accompanying drawing:

Fig. 1 is a side elevation of a milk weighing vat and strainer in which the antisplash device is employed.

Fig. 2 is a fragmentary, plan view thereof, showing the strainer equipped with an antisplash device embodying my invention.

Fig. 3 is a longitudinal, sectional elevation thereof on line 3—3, Fig. 2.

Fig. 4 is a perspective view of the antisplash grid or device removed from the strainer.

Fig. 5 is a fragmentary transverse section, full size, of the antisplash grid.

10 represents a milk weighing vat of ordinary construction, being a rectangular metal tank with an inclined bottom and having a milk strainer 11 supported in an inclined position in its front end. The top of the vat in rear of the strainer is closed by the usual cover 12. As usual, the vat is mounted upon or forms a part of a weighing mechanism or scales (not shown) for weighing the milk, and is provided with the usual valve controlled outlet 13 for the weighed milk.

The strainer shown consists of a rectangular box or container which is supported in an inclined position in the weighing vat and has an open upper end and openings in its lower portion, either in its bottom or side walls or both, covered by wire mesh or other suitable straining material 14 through which the milk poured into the strainer passes into the weighing vat. The parts described may be of the construction illustrated, or any other usual or suitable construction, and the milk strainer may be supported in the inclined position shown in the vat in any suitable manner.

The antisplash grid or device comprises a multiplicity of thin bars or strips 15 of suitable metal arranged in spaced relation to each other and extending across the interior of the strainer box, the grid bars 15 being preferably parallel with each other and extending lengthwise or fore and aft only of the strainer and weighing vat. Preferably these grid bars connect and are rigidly attached at their ends, as by welding, to opposite side bars 16 of a rectangular open grid frame which loosely fits in the strainer box in which the grid is removably supported so that it can be readily placed in position in and removed from the box.

For thus removably supporting the grid in place in the strainer box, the grid frame is preferably provided with legs 17 formed, as shown, by U-shaped bars having upright end portions rigidly attached as by welding at their upper ends to the grid frame near the corners thereof. The cross bars of these U-shaped legs or supports 17 are adapted to rest on the bottom of the strainer box, as shown in Fig. 3, thereby supporting the grid parallel with and above the bottom of the strainer box, the grid being preferably thus supported in a position in which it extends across the strainer box above the upper ends of the screened outlet openings of the strainer box.

The cross bars 15 of the grid are preferably made of relatively thin strips of metal arranged on edge or with their thin edges facing the open upper end or inlet of the strainer box, and the spaces between the bars are wide relatively to the thickness of the bars. Because of the described form and arrangement of the grid bars they offer the minimum surface against which the milk can strike in being poured or dumped into the strainer and the bars will not materially obstruct the passage of the milk through the strainer box, or cause splashing or agitation of the milk. When, however, milk is poured quickly or dumped from the milk cans into the strainer and forcibly strikes the screen or other surface portions in the bottom or lower portion of the strainer box, it will splash upwardly from such surfaces. The splashing drops or particles will strike the grid bars, principally upon their broad, upright side surfaces, because of the greater or less deflection from a vertical direction of the splashing particles and the drops will be arrested by or collect on said upright surfaces of the bars and drain therefrom back into the bottom of the strainer.

I claim as my invention:

1. The combination with a strainer box having an inlet and a screened outlet of an antisplash grid, comprising spaced thin bars arranged on edge and extending crosswise of the strainer box between the inlet and the screened outlet and through which liquid poured into the strainer passes.

2. The combination with a strainer having an open upper end and a screened outlet, of an antisplash grid comprising spaced thin bars arranged on edge and extending crosswise in the strainer between the open upper end and the mesh work of the strainer, and through which the liquid poured into the strainer passes before it reaches the mesh work.

3. The combination with a strainer box having an inlet and a screened outlet, of an antisplash grid arranged crosswise in said strainer box between the inlet and the screened outlet thereof and comprising spaced thin bars extending one way only in the strainer box with the thin edges of the bars facing toward the inlet of the box.

4. The combination with a strainer box having an inlet and a screened outlet, of an antisplash grid removably supported crosswise in said strainer box between the inlet and the screened outlet thereof, and comprising spaced thin bars arranged on edge with the thin edges of the bars facing toward the inlet of the box.

5. The combination with a strainer box supported in a downwardly and rearwardly inclined position and having an open upper end and a screened outlet at its lower portion, of an antisplash grid arranged crosswise in said box above said screened outlet thereof and comprising spaced thin bars extending forwardly and rearwardly in the strainer box and having their thin edges facing upwardly.

6. The combination with a strainer box having an open upper end and a screened outlet at its lower portion, of a removable antisplash grid in said strainer box having legs which removably support the grid in the strainer box extending crosswise thereof above said screened outlet, said grid comprising spaced thin bars arranged with the thin edges of the bars facing upwardly.

7. An antisplash grid for liquid strainers comprising spaced thin bars arranged on edge and all extending in a substantially common direction, and supporting legs for removably supporting said grid in the strainer above the screened outlet thereof.

8. An antisplash grid for liquid strainers, comprising an open frame, and spaced thin bars rigidly secured in said frame and arranged vertically on edge and all extending crosswise in one direction only in said frame.

9. An antisplash grid for liquid strainers, comprising an open frame, spaced thin bars rigidly secured in said frame and arranged vertically on edge and all extending crosswise in one direction only in said frame, and fixed legs for removably supporting said grid in the liquid strainer above the screened outlet thereof.

10. An antisplash grid for liquid strainers, comprising an open frame, and spaced thin bars rigidly secured in said frame and arranged vertically on edge and all extending crosswise in one direction only in said frame, and U-shaped supporting legs fixed to and extending downwardly from opposite end portions of said grid.

LOUIS ROSENFELD.